(12) United States Patent
Wu et al.

(10) Patent No.: US 10,949,128 B2
(45) Date of Patent: Mar. 16, 2021

(54) DATA PROTECTION METHOD

(71) Applicant: INNODISK CORPORATION, New Taipei (TW)

(72) Inventors: Hsi-Hsi Wu, New Taipei (TW); Ming-Sheng Chen, New Taipei (TW); Hong-Yi Zhang, New Taipei (TW)

(73) Assignee: Innodisk Corporation, New Taipei (TW)

( * ) Notice: Subject to any disclaimer, the term of this patent is extended or adjusted under 35 U.S.C. 154(b) by 0 days.

(21) Appl. No.: 16/655,718

(22) Filed: Oct. 17, 2019

(65) Prior Publication Data

US 2020/0371713 A1    Nov. 26, 2020

(30) Foreign Application Priority Data

May 24, 2019   (TW) ................................ 108118034

(51) Int. Cl.
  *G06F 3/06* (2006.01)
  *G06F 12/02* (2006.01)

(52) U.S. Cl.
  CPC .......... *G06F 3/0659* (2013.01); *G06F 3/0619* (2013.01); *G06F 3/0644* (2013.01); *G06F 3/0679* (2013.01); *G06F 12/0246* (2013.01); *G06F 12/0253* (2013.01); *G06F 2212/1032* (2013.01)

(58) Field of Classification Search
  CPC ............... G06F 3/0659; G06F 12/0253; G06F 12/0246; G06F 3/0644; G06F 3/0619; G06F 3/0679; G06F 2212/1032
  See application file for complete search history.

(56) References Cited

U.S. PATENT DOCUMENTS

| | | | |
|---|---|---|---|
| 2010/0268756 A1* | 10/2010 | Lo ....................... | H04L 12/6418 709/203 |
| 2013/0124793 A1* | 5/2013 | Gyl ...................... | G06F 12/0246 711/103 |
| 2019/0340083 A1* | 11/2019 | Ou-Yang .................. | G06F 1/24 |
| 2020/0133842 A1* | 4/2020 | Deguillard ........... | G06F 12/1009 |

* cited by examiner

*Primary Examiner* — Sean D Rossiter
(74) *Attorney, Agent, or Firm* — Rosenberg, Klein & Lee

(57) ABSTRACT

The invention provides a data protection method, which is applied in a data storage device. The data storage device comprises a controller and a plurality of flash memories. The flash memories are formed with a data storage area. When the user wants to protect at least one specific data in the data storage device, a write filter command is transmitted to the data storage device by a host. After the controller of the data storage device receives the write filter command, it will execute a write filter process. When the write filter process is performing, the data storage area is cut into a first partition and a second partition by the controller, and sets the first partition as a read-only area for prohibiting the movement of data, so that the specific data stored in the first partition can be protected by prohibiting the movement of data.

9 Claims, 4 Drawing Sheets

DATA PROTECTION METHOD

This non-provisional application claims priority claim under 35 U.S.C. § 119(a) on Taiwan Patent Application No. 108118034 filed May 24, 2019, the entire contents of which are incorporated herein by reference.

FIELD OF THE INVENTION

The present invention relates to a data protection method, more particularly, to a method for protecting a specific data stored in a data storage device.

BACKGROUND

In the past, solid-state hard disk (SSD) may set a specific partition into a non-writable state by the use of a write protection element, such as an enhanced write filter (EWF) element provided in embedded system of Microsoft, in such a way that some important data (such as the data of operating system) in the specific partition are avoided to be overwritten or rewritten.

For making the operation performance of SSD to achieve the optimal performance, the SSD often executes a garbage collection (GC) process and a wear leveling (WL) process, frequently. When the SSD performs the GC process or the WL process, in addition to the movement of data for the general partition, the movement of data is also performed for the specific partition in the non-writable state. When the data of the specific partition in the non-writable state is moved, logical block addresses in the specific partition will not be changed. Besides, because the performing of the GC process or the WL process, the data in one block labeled by one physical block address pointed by one specific logical block address is moved into other block labeled by other physical block address the specific logical block address will point to another physical address. However, the data in the process of moving may be damaged when an abnormal situation happens, for example, power failure or abnormal operating voltage. If the data moved is damaged and is the data of operating system of the computer, the computer will not be able to operate normally.

SUMMARY

It is one objective of the present invention to provide a data protection method, which is applied to a data storage device having a controller and a plurality of flash memories, the flash memories are formed with a data storage area; when the user wants to protect a specific data in the data storage device, a write filter command is transmitted to the data storage device by the host, and then the controller of the data storage device performs a write filter process; when the write filter process is performed, the controller cuts out at least one first partition and a second partition from the data storage area and sets the first partition to be as a read-only area for prohibiting the moving and writing of data, in such a way that the specific data stored in the read-only area can be avoided to be damaged due to move data or lost due to be overwritten by other data.

To achieve the above objective, the present invention provides a data protection method, which is applied in a data storage device, wherein the data storage device comprises a controller and a plurality of flash memories, the flash memories are formed with a data storage area, steps of the data protection method comprising: transmitting a write filter command to the data storage device; performing a write filter process by the controller of the data storage device according to the write filter command, step of the write filter process comprising: cutting out at least one first partition and a second partition from the data storage area; and setting the first partition to be as a read-only area for prohibiting the moving and writing of data.

In one embodiment of the present invention, further comprising a step of moving data from the second partition to the first partition before the step of setting the first partition to be as a read-only area.

In one embodiment of the present invention, further comprising a step of writing data into the first partition before the step of setting the first partition to be as a read-only area.

In one embodiment of the present invention, wherein the write filter command comprises a message indicating a logical block address range to be cut, the controller can cut out the first partition from the data storage area according to the message indicating the logical block address range to be cut.

In one embodiment of the present invention, wherein the first partition is a partition that is addressed by a continuous logical block address.

In one embodiment of the present invention, wherein the first partition is a partition that is addressed by a distributed logical block address.

In one embodiment of the present invention, when the data storage device is operating in a garbage collection process or a wear leveling process, the data in the first partition is prohibited to be moved or the data is prohibited to be written into the first partition.

In one embodiment of the present invention, wherein the write filter command is issued by a host.

In one embodiment of the present invention, wherein the data storage device stores a customized enhanced write filter function element, the controller of the data storage device performs the write filter process via the customized enhanced write filter function element.

In one embodiment of the present invention, wherein the first partition cut out from the data storage area is a blank magnetic area without any data stored.

DETAILED DESCRIPTION OF THE PREFERRED EMBODIMENTS

Figure 1:
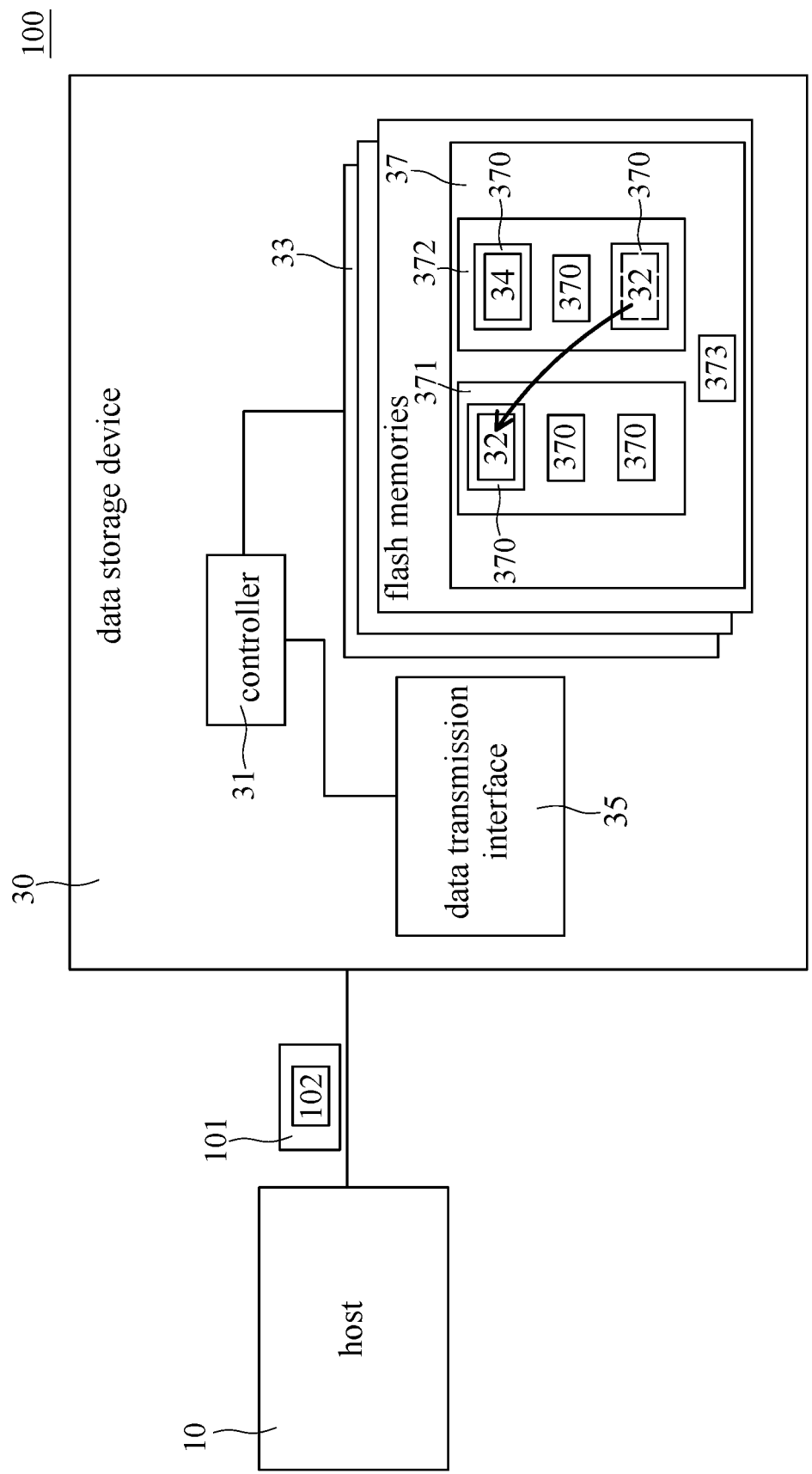
FIG. 1 is a structural view of a computer system of the present invention.

Referring to FIG. 1, there is shown a structural diagram of a computer system of the present invention. As shown in FIG. 1, the computer system 100 comprises a host 10 and a data storage device 30. The host is connected to the data storage device 30. The user may performs a data protection process for at least one specific data 32 stored in the data storage device 30 via the host 10 to ensure the integrity of the specific data 32. In the present invention, the specific data 32 is an operating system data, an encrypted data or other important data.

Figure 2A:
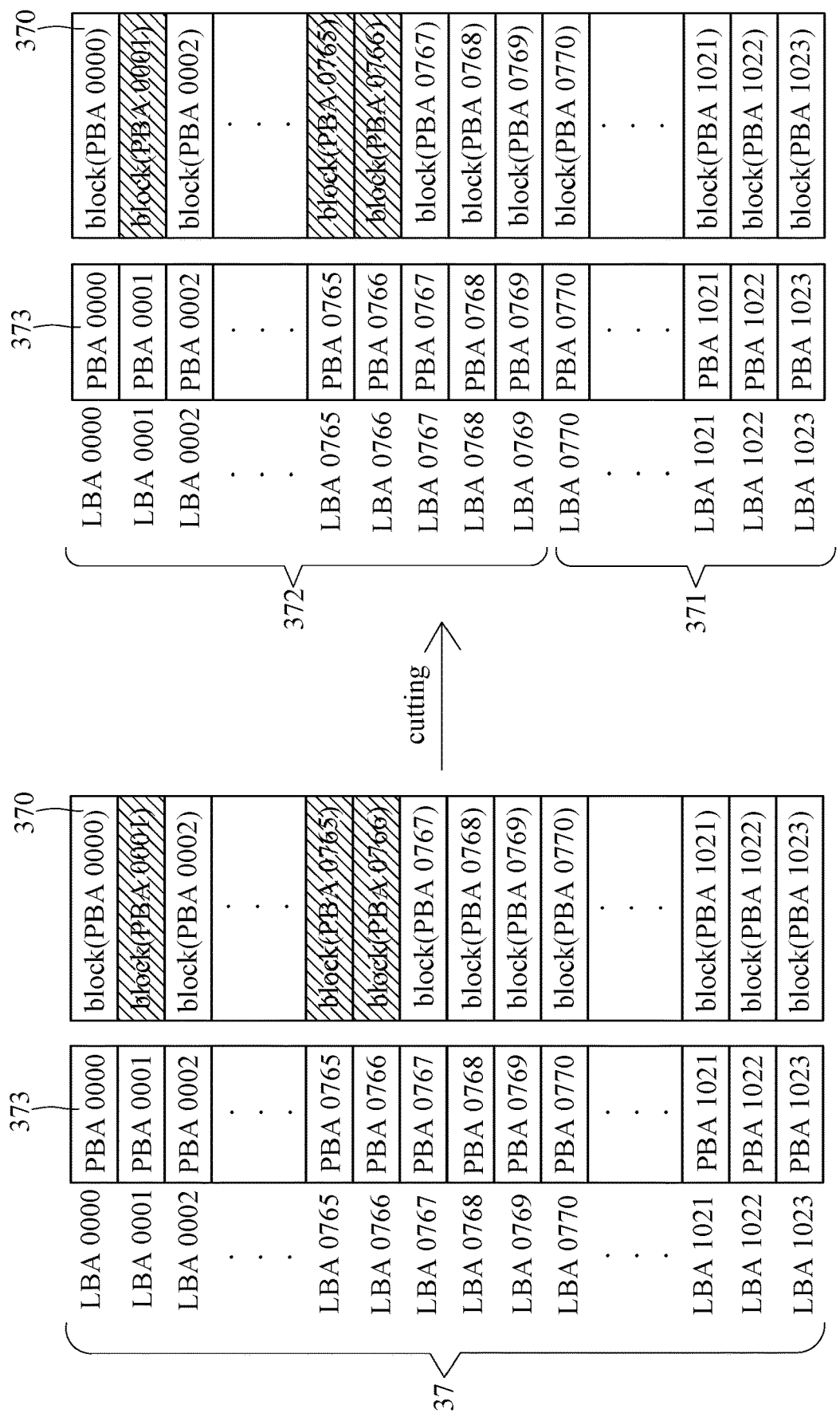
FIG. 2A is a data structural view of flash memories according to one embodiment of the present invention.

The data storage device 30 is a solid-state hard disk (SSD), a memory card, or a flash disk, and comprises a controller 31, a plurality of flash memories 33 and a data transmission interface 35. The data between the data storage device 30 and the host 10 are transmitted each other via the data transmission interface 35. The flash memories 33 are formed with a data storage area 37 for storing data. The data storage area 37 comprises a plurality of block 370 and a lookup table 373. The blocks 370 are used for storing data. As shown in FIG. 2A, the lookup table 373 comprises multiple fields. Each of fields has a logical block address (LBA) and records a physical block address (PBA) pointed by the logical block address (LBA), for example, the field (LBA 0765) records a physical block address (PBA 0765), the controller 31 can access the data in block 370 of the physical block address (PBA 0765) according to the physical block address (PBA 0765) pointed by the field (LBA 0765). For the convenience of explanation, in each of field in the lookup table 373, the digital number of the logical block address (LBA) may be designed to be consistent with the digital number of the physical block address (PBA) it points to; however, in the practical application, the digital number of the logical block address (LBA) is usually inconsistent with the digital number of the physical block address (PBA) it points to.

Further, the data storage device 30 is provided with a customized enhanced write filter (EWF) function element 34, which is a program element for executing the data protection process and is stored in the data storage area 37.

Figure 2B:
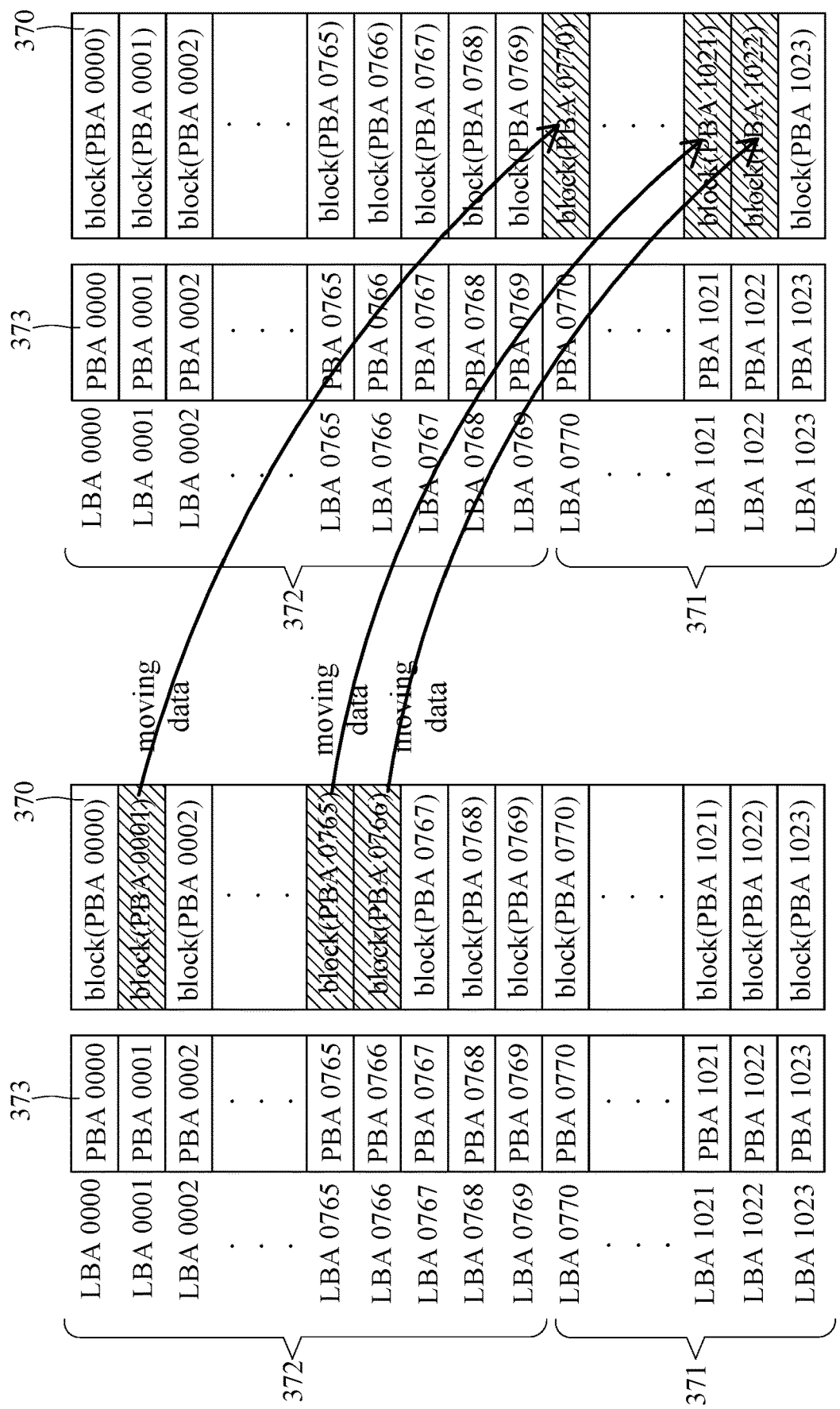
FIG. 2B is a data structural view of flash memories according to another embodiment of the present invention.
Figure 3:
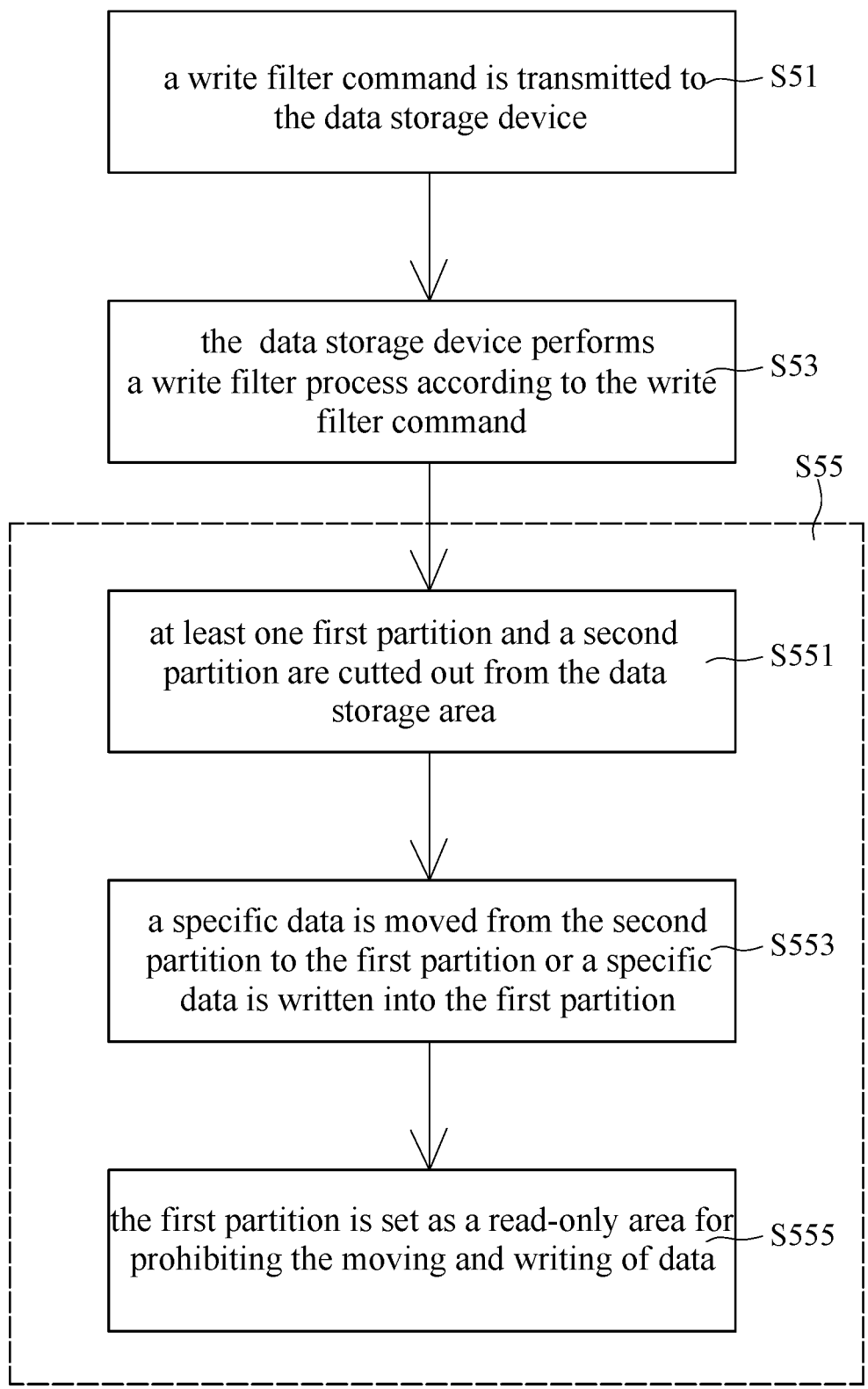
FIG. 3 is a flow chart of a data protection of the present invention.

Referring to FIG. 3, there is shown a flow chart of a data protection method of the present invention, and referring to FIG. 1, FIG. 2A, and FIG. 2B, simultaneously. When the user wants to perform the data protection process for the specific data 32 stored in the data storage device 30, firstly, in step S51, the host 10 transmits a write filter command 101 to the data storage device 30. In step S53, after the data storage device 30 receives the write filter command 101, the controller 31 of the data storage device 30 enables the EWF function element 34 to perform a write filter process S55 by the enabled EWF function element 34.

In step S551 of the write filter process S55, the controller 31 can cut out at least one first partition 371 from the data storage area 37, and the remaining data storage area 37 will be regarded as a second partition 372, as shown in FIG. 2A. In addition, the first partition 371 cut out from the data storage area 37 is a blank magnetic area without any data stored. Besides, the first partition 371 and the second partition 372 comprise a plurality of block 370, respectively. Each of blocks 370 has a physical block address (PBA), which is pointed to by a corresponding logical block address (LBA). In one embodiment of the present invention, the write filter command 101 includes a message 102 indicating a logical block address range to be cut. The controller 31 is able to cut out the first partition 371 from the data storage area 37 according to the indication of the message 102. For example, the message 102 indicates a logical block address range (LBA 0770 to LBA 1023) to be cut, the controller 31 cuts out a magnetic region corresponding to the logical block address range (LBA 0770 to LBA 1023) from the data storage area, the magnetic region cut by the controller 31 will be as the first partition 371. In other words, the message 102 is for indicating the logical block address range of the first partition 371 to be cut out from the data storage area 37. In one embodiment of the present invention, the first partition 371 is a partition that is addressed by a continuous logical block address, such as LBA 0770 to LBA 1023. In another embodiment of the present invention, alternatively, the first partition 371 can also be a partition that is addressed by a distributed logical block address.

After the first partition 371 is cut out from the data storage area 37, performing the step S553, the controller 31 moves the specific data 32 stored in the blocks 370 of the second partition 372 to the blocks 370 of the first partition 371, for example, the specific data 32 stored in the blocks (PBA 0001, PBA 0765, PBA 0766) 370 of the second partition 372 is moved to the blocks (PBA 0770, PBA 1021, PBA 1022) 370 of the first partition 371 by the controller 31. Alternatively, the host 10 writes the outside specific data 32 into the blocks (PBA 0770, PBA 1021, and PBA 1022) 370 of the first partition 371. After the specific data 32 is moved or written into the blocks 370 of the first partition 371, performing the step S555, the controller 31 sets the first partition 371 as a read-only area for prohibiting the moving and writing of data, and therefore limits that the data stored in the blocks 370 of the PBA pointed by the LBA of the first partition 371 cannot be changed. Afterwards, when the data storage device 30 is operating in a garbage collection process or a wear leveling process, the data in the blocks 370 of the second partition 372 allows to be moved or the data allows to be written into the blocks 370 of the second partition 372; on the contrary, the data in the blocks 370 of the first partition 371 is prohibited to be moved or the data is prohibited to be written into the blocks 370 of the first partition 371, in such the way that the specific data 32 in the first partition 371 can be protection.

Accordingly, a read-only area for prohibiting the moving and writing of data is defined in the data storage area 37 of the data storage device 30, and thus the specific data 32 stored in the read-only area can be avoided to be damaged due to move data or lost due to be overwritten by other data.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A data protection method, which is applied in a data storage device, wherein the data storage device comprises a controller and a plurality of flash memories, the flash memories are formed with a data storage area, steps of the data protection method comprising:
   transmitting a write filter command to the data storage device;
   performing a write filter process by the controller of the data storage device according to the write filter command, step of the write filter process comprising:
   cutting out at least one first partition and a second partition from the data storage area;
   moving data from the second partition to the first partition; and
   setting the first partition as a read-only area for prohibiting the moving and writing of data.

2. The data protection method according to claim 1, further comprising a step of writing data into the first partition before the step of setting the first partition to be as the read-only area.

3. The data protection method according to claim 1, wherein the write filter command comprises a message indicating a logical block address range to be cut, the controller can cut out the first partition from the data storage area according to the indication of the message.

4. The data protection method according to claim 1, wherein the first partition is a partition that is addressed by a continuous logical block address.

5. The data protection method according to claim 1, wherein the first partition is a partition that is addressed by a distributed logical block address.

6. The data protection method according to claim 1, when the data storage device is operating in a garbage collection process or a wear leveling process, the data in the first partition is prohibited to be moved or the data is prohibited to be written into the first partition.

7. The data protection method according to claim 1, wherein the write filter command is issued by a host.

8. The data protection method according to claim 1, wherein the data storage device stores a customized enhanced write filter function element, the controller of the data storage device performs the write filter process via the customized enhanced write filter function element.

9. The data protection method according to claim 1, wherein the first partition cut out from the data storage area is a blank magnetic area without any data stored.

\* \* \* \* \*